(12) United States Patent
Sugimoto et al.

(10) Patent No.: US 9,689,080 B2
(45) Date of Patent: Jun. 27, 2017

(54) LAYERED ALKALI IRIDATE, LAYERED IRIDIC ACID, AND IRIDIUM OXIDE NANOSHEET

(71) Applicant: SHINSHU UNIVERSITY, Matsumoto-shi (JP)

(72) Inventors: Wataru Sugimoto, Ueda (JP); Wataru Shimizu, Ueda (JP)

(73) Assignee: SHINSHU UNIVERSITY, Matsumoto-shi (JP)

( * ) Notice: Subject to any disclaimer, the term of this patent is extended or adjusted under 35 U.S.C. 154(b) by 0 days.

(21) Appl. No.: 15/261,331

(22) Filed: Sep. 9, 2016

(65) Prior Publication Data

US 2016/0376715 A1 Dec. 29, 2016

Related U.S. Application Data

(63) Continuation-in-part of application No. PCT/JP2015/056972, filed on Mar. 10, 2015.

(30) Foreign Application Priority Data

Mar. 11, 2014 (JP) ................................ 2014-048253

(51) Int. Cl.
*B01J 23/58* (2006.01)
*B01J 35/00* (2006.01)
(Continued)

(52) U.S. Cl.
CPC ........... *C25B 11/0447* (2013.01); *B01J 23/58* (2013.01); *B01J 35/002* (2013.01);
(Continued)

(58) Field of Classification Search
CPC ................................ B01J 23/58; B01J 35/002
See application file for complete search history.

(56) References Cited

U.S. PATENT DOCUMENTS

| 5,518,976 A | * | 5/1996 | Itoh | ...................... | B01D 53/945 |
| | | | | | 423/713 |
| 5,997,830 A | * | 12/1999 | Itoh | ..................... | B01D 53/9418 |
| | | | | | 423/213.5 |

(Continued)

FOREIGN PATENT DOCUMENTS

| JP | 2006-117519 A | 5/2006 |
| JP | 2006-228450 A | 8/2006 |

(Continued)

OTHER PUBLICATIONS

Wataru Sugimoto et al., "Synthesis of IrO2 Nanosheet", 94th Annual Meeting of the Chemical Society of Japan in Spring (2014) p. 360 (2F1-09), The Chemical Society of Japan, Mar. 12, 2014; 3 pages.

(Continued)

*Primary Examiner* — Cam N. Nguyen
(74) *Attorney, Agent, or Firm* — Oblon, McClelland, Maier & Neustadt, L.L.P.

(57) ABSTRACT

Provided is a layered alkali iridate and a layered iridic acid to be used for producing iridium oxide nanosheets, and an iridium oxide nanosheet. A layered alkali iridate with composition of $M_xIrO_y \cdot nH_2O$ (where M is a monovalent metal, x is 0.1 to 0.5, y is 1.5 to 2.5, and n is 0.5 to 1.5), wherein $M_xIrO_y \cdot nH_2O$ has a layered structure. The M is potassium, and the layered alkali iridate has diffraction peaks at $2\theta$ diffraction angles of 13.0° and 26.0°. A layered iridic acid with a composition of $H_xIrO_y \cdot nH_2O$ (where x is 0.1 to 0.5, y is 1.5 to 2.5, and n is 0 to 1), wherein $H_xIrO_y \cdot nH_2O$ has a layered structure. This layered iridic acid has diffraction peaks at $2\theta$ diffraction angles of 12.3° and 24.6°. A single crystalline iridium oxide nanosheet having a thickness of 3 nm or less.

5 Claims, 5 Drawing Sheets

(51) Int. Cl.
| | |
|---|---|
| *C25B 11/04* | (2006.01) |
| *C01G 55/00* | (2006.01) |
| *C25B 1/26* | (2006.01) |
| *B01J 37/04* | (2006.01) |
| *B01J 37/06* | (2006.01) |
| *B01J 37/08* | (2006.01) |
| *B01J 37/34* | (2006.01) |
| *B01J 37/00* | (2006.01) |
| *B01J 37/02* | (2006.01) |
| *C25B 1/02* | (2006.01) |
| *C25B 1/13* | (2006.01) |
| *B82Y 30/00* | (2011.01) |
| *B82Y 40/00* | (2011.01) |

(52) U.S. Cl.
CPC ....... *B01J 37/0063* (2013.01); *B01J 37/0217* (2013.01); *B01J 37/04* (2013.01); *B01J 37/06* (2013.01); *B01J 37/088* (2013.01); *B01J 37/343* (2013.01); *C01G 55/00* (2013.01); *C01G 55/002* (2013.01); *C01G 55/004* (2013.01); *C25B 1/02* (2013.01); *C25B 1/13* (2013.01); *C25B 1/26* (2013.01); *C25B 11/0405* (2013.01); *B82Y 30/00* (2013.01); *B82Y 40/00* (2013.01); *C01P 2002/72* (2013.01); *C01P 2004/03* (2013.01); *C01P 2004/04* (2013.01); *C01P 2004/24* (2013.01)

(56) References Cited

U.S. PATENT DOCUMENTS

| | | | |
|---|---|---|---|
| 7,022,621 | B1 | 4/2006 | Zhang et al. |
| 7,976,989 | B2 * | 7/2011 | Lopez .................. B01J 23/468 |
| | | | 204/290.09 |
| 2006/0086314 | A1 | 4/2006 | Zhang et al. |
| 2006/0088993 | A1 | 4/2006 | Zhang et al. |
| 2006/0099758 | A1 | 5/2006 | Zhang et al. |
| 2006/0124926 | A1 | 6/2006 | Zhang et al. |
| 2008/0010707 | A1 | 1/2008 | Zhang et al. |
| 2008/0277746 | A1 | 11/2008 | Hsu et al. |
| 2009/0011536 | A1 | 1/2009 | Zhang et al. |
| 2009/0024182 | A1 | 1/2009 | Zhang et al. |

FOREIGN PATENT DOCUMENTS

| | | |
|---|---|---|
| JP | 2008-029838 A | 2/2008 |
| JP | 2008-057023 A | 3/2008 |
| JP | 2010-280977 A | 12/2010 |
| JP | 2013-058429 A | 3/2013 |

OTHER PUBLICATIONS

Written Opinion of the International Searching Authority issued Jun. 9, 2015 in PCT/JP2015/056972, filed Mar. 10, 2015 (with English Translation).

* cited by examiner

1 Layer   3 Layers   5 Layers

LAYERED ALKALI IRIDATE, LAYERED IRIDIC ACID, AND IRIDIUM OXIDE NANOSHEET

CROSS REFERENCE TO RELATED APPLICATIONS

This application is a Continuation-in-Part Application of International Application No. PCT/JP2015/056972 filed Mar. 10, 2015, claiming priority based on Japanese Patent Application No. 2014-048253, filed Mar. 11, 2014, the contents of all of which are incorporated herein by reference in their entirety.

FIELD OF THE INVENTION

The present invention relates to layered alkali iridate, a layered iridic acid, and an iridium oxide nanosheet.

BACKGROUND ART

A nanosheet is a two-dimensional material having high anisotropic morphology with a thickness in the order of nanometers and width that is tens to more than several hundred times that value. Such a nanosheet not only inherits the functionality (conductivity, semiconductive properties, dielectric properties, and the like) of the parent phase, but also has a high specific surface area that is required for catalytic reactions and the like. Further, the nanosheet may exhibit unique properties such as one-dimensional quantum size effects. Furthermore, nanosheets can be used as functional building blocks to fabricate artificial superlattice nanostructures or three-dimensional architectures that cannot be achieved by conventional methods due to thermodynamic constraints, thus, the nanosheet potentially allows much more freedom in the control of properties and characteristics. Moreover, wet processing approaches can be utilized to fabricate such three dimensional nanostructures, which distinguishes nanosheet approach from typical physical deposition processes such as vapor phase synthesis, molecular beam epitaxy, etc. Such properties make nanosheets ideal for practical application including energy devices, from the viewpoints of not only performance but the processing route as well.

Proposed methods of nanosheet synthesis include methods which are induced via build-up from molecules, ions, and the like, and methods involving exfoliation of a layered compound into single layers. Such methods have been applied to achieve nanosheets composed of metal oxides and chalcogenides. Metallic nanosheets composed of a precious metal such as platinum or gold using a liquid phase reaction have also been proposed (refer to Patent Documents 1 and 2).

As a different approach for obtaining metallic nanosheets, the present inventors proposed technology that uses a layered metal oxide as a precursor (refer to Patent Document 3). This technology is a method for obtaining a metallic ruthenium nanosheet from a precursor by first preparing a ruthenium oxide with a nanosheet structure, and subsequent reduction to ruthenium nanosheet. A metallic ruthenium nanosheet film is obtained by reducing the ruthenium oxide nanosheet in a thin film state.

PATENT DOCUMENTS

Patent Document 1: Japanese Laid-Open Patent Application No. 2006-228450

Patent Document 2: Japanese Laid-Open Patent Application No. 2008-57023

Patent Document 3: Japanese Laid-Open Patent Application No. 2010-280977

SUMMARY OF THE INVENTION

Problems to be Solved by the Invention

As described above, a crystalline metal oxide nanosheet has a thickness that is one to a few octahedron thick, and a structure that extends two-dimensionally (into a flat shape). Many nanosheets can be obtained by exfoliating oxides having a layered structure. Such oxide nanosheets have the advantage of accessible surface area that is greater than that of a nanoparticle consisting of the same number of atoms. While most nanosheets are insulators or poor electronic conductors, some show high electronic conductivity, for example carbon (graphene) and ruthenium oxide (ruthenium oxide nanosheet).

The present invention focuses on iridium oxide being used as the main component in dimensionally stable electrodes in electrolysis (such as oxygen, ozone, and chlorine) as well as electrocatalytic oxygen reduction, ion separation, and the like, and provides a layered alkali iridate and a layered iridic acid used for producing an iridium oxide nanosheet.

Means for Solving the Problems (1) An alkali iridate according to the present invention for solving the above-described problems has a composition of $M_xIrO_y \cdot nH_2O$ (where M is a alkali metal, x is 0.1 to 0.5, y is 1.5 to 2.5, and n is 0.5 to 1.5), wherein $M_xIrO_y \cdot nH_2O$ has a layered structure.

In the layered alkali iridate according to the present invention, the M is potassium and the layered alkali iridate has diffraction peaks at $2\theta$ diffraction angles of $13.0°$ and $26.0°$.

(2) An iridic acid according to the present invention for solving the above-described problems has a composition of $H_xIrO_y \cdot nH_2O$ (where x is 0.1 to 0.5, y is 1.5 to 2.5, and n is 0 to 1), wherein $H_xIrO_y \cdot nH_2O$ has a layered structure.

The layered protonated iridate according to the present invention has diffraction peaks at $2\theta$ diffraction angles of $12.3°$ and $24.6°$.

(3) The iridium oxide nanosheet according to the present invention for solving the above-described problems is composed of a single-crystal iridium oxide having a thickness of 3 nm or less.

Effect of the Invention

According to the present invention, it is possible to provide a layered alkali iridate and a layered iridic acid to be used for producing an iridium oxide nanosheet. Iridium oxide is typically used as the main component as an electrocatalyst with dimensionally stability for electrolysis, ion separation, and the like, making the iridium oxide compounds invented here applicable to these, in particular as a catalyst for oxygen reduction, as well as oxygen, chlorine and ozone evolution, and the like.

EMBODIMENTS OF THE INVENTION

Figure 1:
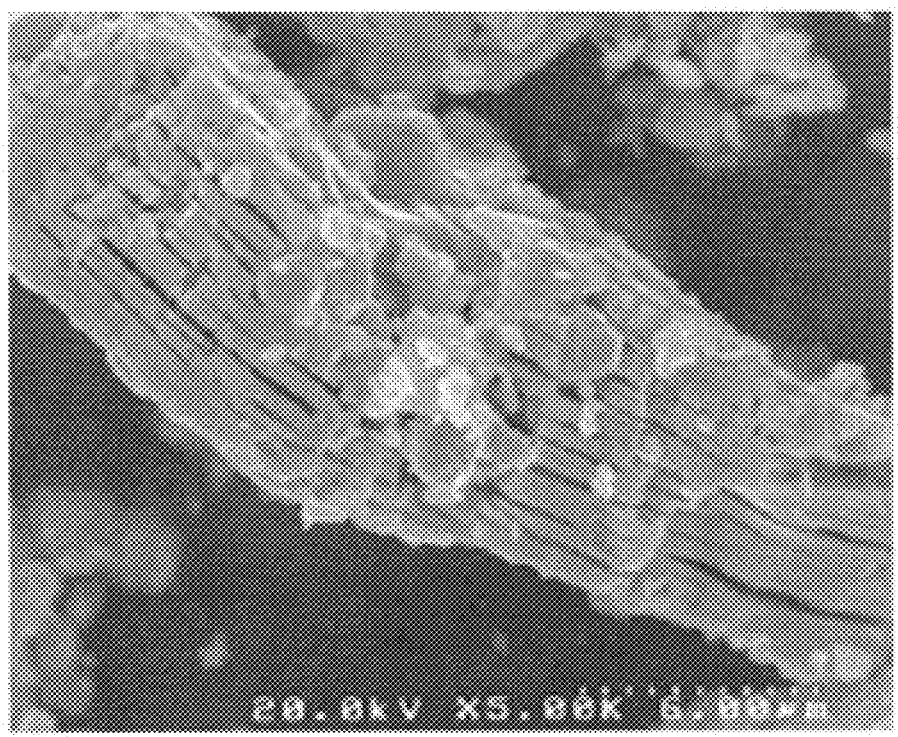
FIG. 1 is an electron microscope image of a layered alkali iridate.

The following describes in detail a layered alkali iridate, a layered iridic acid, and an iridium oxide nanosheet according to the present invention. The present invention, however, is not limited to the following description in the range included in the technical scope thereof.

[Layered Alkali Iridate and Layered Iridic Acid]

A layered alkali iridate according to the present invention has a composition of $M_xIrO_y \cdot nH_2O$ (where M is an alkali metal, x is 0.1 to 0.5, y is 1.5 to 2.5, and n is 0.5 to 1.5), wherein $M_xIrO_y \cdot nH_2O$ has a layered structure. Examples of M include Li, Na, K, Rb, and Cs. The values of x and y can vary based on the amount of iridium oxide and alkali metal compound that is mixed during the synthetic process.

The layered alkali iridate is produced by first (1) mixing iridium oxide with an alkali metal compound, (2) pelletizing the obtained mixture, (3) subjecting the formed pellets to a pre-calcination process, (4) grinding the pre-calcined pellets to a powder and making a pellet, (5) subjecting the pellet to calcination at higher temperature, and (6) final washing with water to remove water-soluble impurities. Thus, the layered alkali iridate can be obtained.

The mixing step of (1) and the grinding step of (4) are preferably performed under nitrogen atmosphere. While the alkali metal compound used in the mixing step of (1) is not particularly limited, examples include potassium carbonate. While the mixture ratio of iridium oxide to the alkali metal compound is not particularly limited, the ratio may be set to, for example, iridium oxide:alkali metal compound=about 1:1 to 1:4. The pre-calcination step of (3) can be a heat treatment of several tens of minutes to several hours (one hour, as a typical example) within a range of 700° C. to 800° C. (750° C., as a typical example), for example, in an inert gas environment, and the second firing step of (5) can also be a heat treatment of several tens of minutes to several hours (1 hour, as a typical example) within a range of 700° C. to 800° C. (780° C., for example), for example, in an inert gas environment.

The layered iridic acid can be obtained by treating the obtained layered alkali iridate in an acidic solution. Treatment in an acidic solution is performed by dispersing the layered alkali iridate in an acidic solution, for example 1 M HCl, for about one to four days (three days, as a typical example). The obtained layered iridic acid has a composition of $H_xIrO_y \cdot nH_2O$ (where x is 0.1 to 0.5, y is 1.5 to 2.5, and n is 0 to 1), wherein $H_xIrO_y \cdot nH_2O$ possesses a layered structure.

[Iridium Oxide Nanosheet]

An iridium oxide nanosheet according to the present invention is an iridium oxide single-crystal sheet having a thickness of 3 nm or less. This iridium oxide nanosheet is produced by first reacting an alkylammonium or an alkylamine with the layered iridate obtained above to form an alkylammonium-iridate intercalation compound with a layered structure, and subsequently mixing the alkylammonium-iridate intercalation compound with a solvent such as water to obtain an iridium oxide nanosheet colloid with a dark blue color. It should be noted that while various materials may be used as the alkylammonium or the alkylamine, tetrabutylammonium, for example, may be preferably used.

Re-assembly of the iridium oxide nanosheet into a thin film can be conducted by electrostatic interaction between the obtained iridium oxide nanosheet and a counter cation. Specifically, a cleaned substrate (a Si substrate or a quartz substrate, for example) is positively charged by adsorption of a cationic polymer and then immersed in the iridium oxide nanosheet colloid. The substrate can be coated with one layer of the iridium oxide nanosheet in a single immersion step. Multilayers of iridium oxide nanosheet can be deposited by carrying out the immersion in cationic polymers solution and iridium oxide nanosheet colloid, with the amount of layers equivalent to the number of repetitions. For example, 5, 10, 10, and so on repetition affords thin films composed of 5 layers, 10 layers, 20 layers, and so on, of iridium oxide nanosheet.

In the present invention, focus is placed on iridium as the central atom and the object is to obtain an iridium oxide nanosheet. The layered alkali iridate used for producing the iridium oxide nanosheet is newly synthesized, the layered iridic acid is newly synthesized from the layered alkali iridate, and the iridium oxide nanosheet is obtained from the layered iridate. Iridium oxide is used as the main component in dimensionally stable electrodes for electrolysis, ion separation, and the like, making the invented iridium oxide-based compounds applicable to these, in particular as an electrocatalyst for oxygen reduction, oxygen, chlorine and ozone evolution, and the like. Further, as iridium oxide is electrochemically stable in a wide potential range and has low solubility in acids and bases, the invented iridium oxide-based compounds can be used as a conductive metal oxide having excellent corrosion resistance as well as electronic conductivity.

EXAMPLES

The present invention will now be described in detail on the basis of examples.

Example 1

A layered potassium iridate and a layered iridic acid were synthesized. First, iridium oxide ($IrO_2$) was mixed with potassium carbonate ($K_2CO_3$), in nitrogen atmosphere. The mixture ratio ($IrO_2:K_2CO_3$) was set to 1:2. The mixture was pressed into pellets and pre-calcined at 750° C. for 1 hour under argon flow. The pellets were taken out and crushed into powder and again pressed into a pellet. Next, the formed pellets were calcined at 780° C. for 1 hour under argon flow. The samples exhibited a black color with a luster. The pellets were crushed again and washed with copious amount of water. Thus, a layered potassium iridate was obtained. The layered potassium iridate was reacted with 1 M HCl for three days to exchange the interlayer potassium ions with protons, resulting in a layered iridic acid. The supernatant liquid was dark brown.

Figure 2:
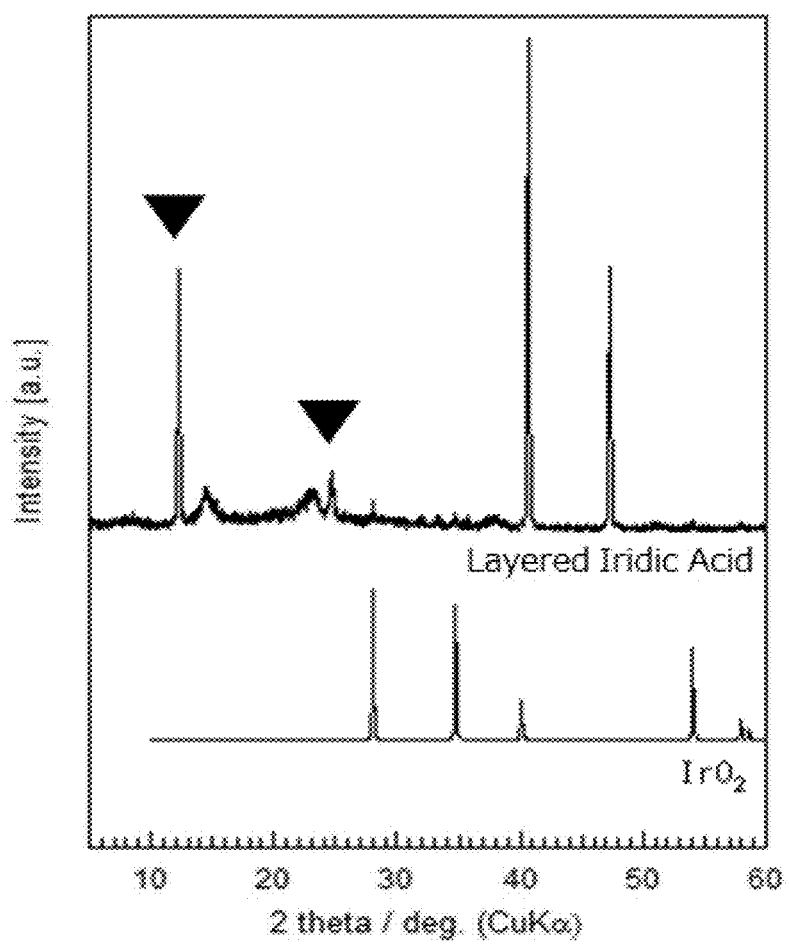
FIG. 2 is an X-ray diffraction pattern of a layered iridic acid.

Scanning electron microscopy was conducted to observe the morphology of the compounds. FIG. 1 is a typical scanning electron microscope image of layered potassium iridate. The image shows a clear layered morphology. Similar layered morphology was observed for the layered iridic acid. FIG. 2 is an X-ray diffraction pattern (X-ray source:

CuKα) of the layered iridic acid. The layered iridic acid showed peaks at 2θ values of 12.3° and 24.6°, while the layered potassium iridate have peaks at 2θ values of 13.0° and 26.0°. It should be noted that, in both cases, peaks due to iridium oxide, the starting material, were not observed.

The composition of layered iridic acid and layered potassium iridate composition was analyzed using an energy dispersive X-ray spectroscope (EDX; EX-200, manufactured by oriba, Ltd.). The atomic ratio was K/Ir/O=7.5/23/69 for the layered potassium iridate and Ir/O=28/72 for layered iridic acid. No potassium was detected in layered iridic acid.

Example 2

Iridium oxide nanosheet was produced from the layered iridic acid. A 10% tetrabutylammonium hydroxide (TBAOH) solution was added to the layered iridic acid synthesized according to example 1 at the ratio of Ir:TBAOH=1:5. The dispersion was subjected to shaking for seven days at 25° C. and 160 rpm. Thus, a 0.5-g/L iridium oxide nanosheet colloid with a dark blue color was obtained.

Example 3

An iridium oxide nanosheet film was obtained using the iridium oxide nanosheet colloid obtained in example 2. The nanosheet film was fabricated by layer by layer (LbL) deposition utilizing electrostatic interaction. First, a cleaned substrate (a Si substrate or a quartz substrate, for example) is positively charged by adsorption of a cationic polymer and then immersed in a 0.3-g/L iridium oxide nanosheet colloid for 20 minutes. The Si substrate was then pulled up, washed with ultrapure water, immersed in a solution of cationic polymer once again. This sequence was repeated to obtain multilayers of iridium oxide nanosheet.

Figure 3:
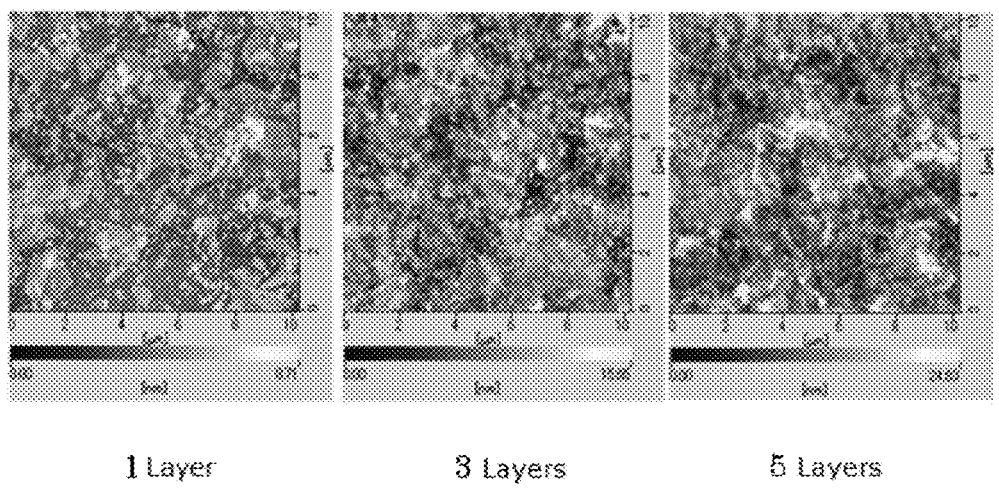
FIG. 3 is AFM images of an iridium oxide nanosheet thin film.
Figure 4:
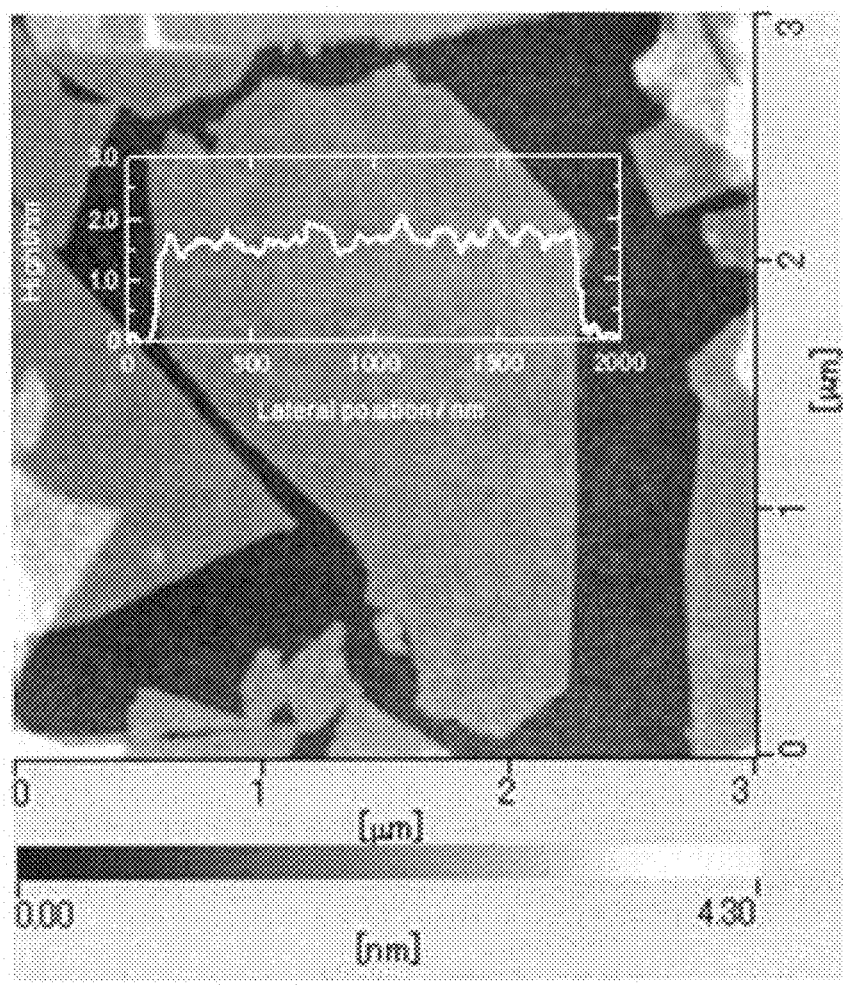
FIG. 4 is an enlarged AFM image of an iridium oxide nanosheet.

Atomic force microscopy (AFM) was acquired in dynamic force mode (DFM) using a scanning probe microscope (SPM; SPA400, manufactured by Seiko Instruments, Inc.). FIG. 3 shows a typical AFM images of the surface of iridium oxide nanosheet films with 1, 3, and 5 layered samples. FIG. 4 is an enlarged AFM image showing that the thickness of individual iridium oxide nanosheets are 1.65 nm±0.1 nm.

Figure 5A:
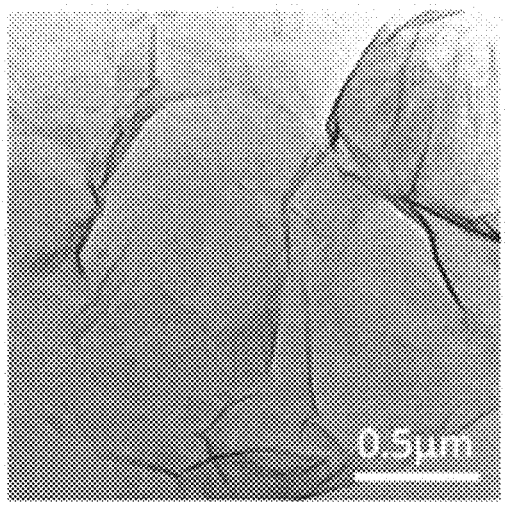
FIG. 5A is a TEM image.
Figure 5B:
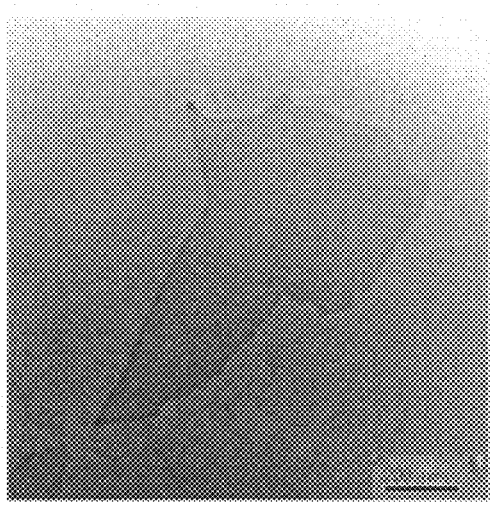
FIG. 5B is an enlarged TEM image.
Figure 5C:
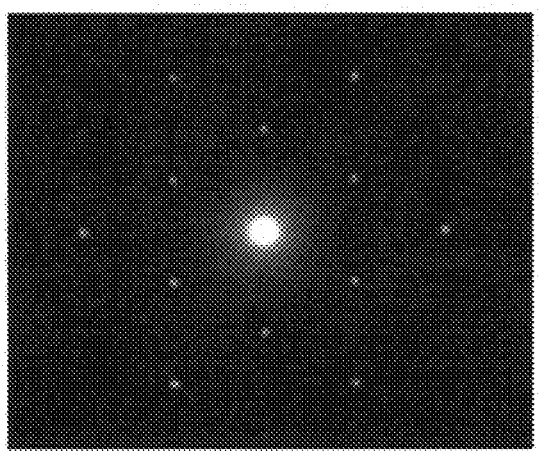
FIG. 5C is an electron diffraction pattern, showing the morphology and structure of the iridium oxide nanosheet.

The transmission electron microscope (TEM) image in FIG. 5A and the enlarged TEM image in FIG. 5B of the iridium oxide nanosheet shows the two dimensional morphology. The electron diffraction pattern shown in FIG. 5C reveals that the iridium oxide nanosheet is single crystalline. These TEM images were taken by dropping the iridium oxide nanosheet colloid onto the TEM grid (carbon reinforced film, No. 1605, manufactured by JEOL Ltd.)

Example 4

20 μL of the 0.3-g/L iridium oxide nanosheet colloid obtained in example 2 was dropped onto a 5-mm diameter glassy carbon rod (manufactured by Tokai Carbon Co., Ltd.) which was buff-polished with 0.05-μm aluminum powder, and dried for 30 minutes at 60° C. 20 μL of a 5-mass % Nafion (registered trademark of DuPont) solution was dropped on the glassy carbon, and dried for 30 minutes at 60° C. Thus, the working electrode for electrochemical studies was produced.

Rotating disk electrode (RDE) measurement was performed using a standard three-electrode electrochemical cell. A Pt mesh was used as a counter electrode and a silver-silver chloride electrode was used as a reference electrode. The electrode described above was used as a working electrode. The RDE measurement was performed in 0.5 M $H_2SO_4$ electrolyte.

Specific capacitance evaluation was conducted by cyclic voltammetry within a potential range of 0.2 to 1.2 V (vs. RHE), and scan rate within the range of 2 to 500 mV/s. A distinctive anodic peak was observed at 0.95 V (vs. RHE) with the corresponding cathodic peak at 0.85 V (vs. RHE).

To evaluate the electrochemical stability of the iridium oxide nanosheet, the higher cut-off potential was raised from 1.2 V to 1.3 V, 1.4 V, and 1.5 V (vs. RHE), and cycled at 50 mV/s. The lower cut-off potential was set at 0.05 V (vs. RHE). In the potential range of 0.05 V to 1.5 V (vs. RHE), gas evolution associated with electrolysis did not occur, and no dissolution of iridium oxide nanosheet occurred.

Example 5

The electrochemical properties in 1 M $Li_2SO_4$ were evaluated in the same manner as in example 4. In the potential range of 0.05 V to 1.5 V (vs. RHE), evolution associated with electrolysis did not occur, and no dissolution of iridium oxide nanosheet occurred.

What is claimed is:

1. An alkali iridate having a composition of $M_xIrO_y \cdot nH_2O$ (where M is an alkali metal, x is 0.1 to 0.5, y is 1.5 to 2.5, and n is 0.5 to 1.5), wherein $M_xIrO_y \cdot nH_2O$ has a layered structure.

2. The alkali iridate according to claim 1, wherein the M is potassium and the layered alkali iridate has diffraction peaks at 2θ diffraction angles of 13.0° and 26.0°.

3. An iridic acid having a composition of $H_xIrO_y \cdot nH_2O$ (where x is 0.1 to 0.5, y is 1.5 to 2.5, and n is 0 to 1), wherein $H_xIrO_y \cdot nH_2O$ has a layered structure.

4. The iridic acid according to claim 3 having diffraction peaks at 2θ diffraction angles of 12.3° and 24.6°.

5. An iridium oxide nanosheet composed of single crystalline iridium oxide sheet with a nanosheet morphology having a thickness of 3 nm or less.

* * * * *